US011328582B1

(12) United States Patent
Younge

(10) Patent No.: US 11,328,582 B1
(45) Date of Patent: May 10, 2022

(54) ENHANCED HAZARD DETECTION DEVICE CONFIGURED WITH SECURITY AND COMMUNICATIONS CAPABILITIES

(71) Applicant: T-Mobile USA, Inc., Bellevue, WA (US)

(72) Inventor: Mark Younge, Golden, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/369,874

(22) Filed: Jul. 7, 2021

(51) Int. Cl.
| | |
|---|---|
| G08B 29/18 | (2006.01) |
| G08B 21/18 | (2006.01) |
| G08B 13/196 | (2006.01) |
| G08B 17/10 | (2006.01) |
| G16Y 30/10 | (2020.01) |
| H04W 84/12 | (2009.01) |
| H04W 4/80 | (2018.01) |

(52) U.S. Cl.
CPC ..... *G08B 29/181* (2013.01); *G08B 13/19602* (2013.01); *G08B 17/10* (2013.01); *G08B 21/182* (2013.01); *G16Y 30/10* (2020.01); *H04W 4/80* (2018.02); *H04W 84/12* (2013.01)

(58) Field of Classification Search
CPC ............ G08B 29/181; G08B 13/19602; G08B 17/10; G08B 21/182; H04W 4/80; H04W 84/12
See application file for complete search history.

(56) References Cited

U.S. PATENT DOCUMENTS

| | | | |
|---|---|---|---|
| 5,563,578 | A | 10/1996 | Isenstein |
| 5,694,960 | A | 12/1997 | Turk et al. |
| 5,831,526 | A | 11/1998 | Hansler et al. |
| 5,880,954 | A | 3/1999 | Thomson et al. |
| 5,898,369 | A | 4/1999 | Godwin |
| 6,611,204 | B2 | 8/2003 | Schmurr |
| 6,684,306 | B1 | 1/2004 | Nagasawa et al. |
| 6,822,555 | B2 | 11/2004 | Mansfield et al. |

(Continued)

FOREIGN PATENT DOCUMENTS

| | | |
|---|---|---|
| CN | 202916938 U | 5/2013 |
| CN | 203161298 U | 8/2013 |

(Continued)

*Primary Examiner* — Ojiako K Nwugo
(74) *Attorney, Agent, or Firm* — Perkins Coie LLP

(57) ABSTRACT

An enhanced hazard detection device has multiple sensors. A primary sensor continuously monitors for a hazard in a vicinity of the enhanced hazard detection device, and a secondary sensor can detect or measure a physical property in the vicinity of the enhanced hazard detection device. The enhanced hazard detection device can include communications circuitry to wirelessly couple the enhanced hazard detection device to a local network. A power management controller of the enhanced hazard detection device can dynamically manage usable power, where usable power for the secondary sensor and the communications circuitry is conditioned on sufficient usable power being available for the primary sensor. As such, the enhanced hazard detection device can monitor a change in usable power and, if necessary, divert usable power from most of the multiple sensors and/or the communications circuitry to the primary sensor, to maintain uninterrupted hazard detection.

20 Claims, 5 Drawing Sheets

(56) References Cited

U.S. PATENT DOCUMENTS

| | | |
|---|---|---|
| 6,873,256 B2 | 3/2005 | Lemelson et al. |
| 6,952,169 B1 | 10/2005 | Simtion |
| 6,995,665 B2 | 2/2006 | Appelt et al. |
| 7,109,859 B2 | 9/2006 | Peeters |
| 7,188,767 B2 | 3/2007 | Penuela et al. |
| 7,301,455 B2 | 11/2007 | Mckenna et al. |
| 7,378,954 B2 | 5/2008 | Wendt |
| 7,486,495 B1 | 2/2009 | Diederichs et al. |
| 7,508,314 B2 | 3/2009 | Andres et al. |
| 7,522,063 B2 | 4/2009 | Ehlers |
| 7,567,174 B2 | 7/2009 | Woodard et al. |
| 7,592,923 B2 | 9/2009 | Lax |
| 7,619,534 B2 | 11/2009 | Barrieau et al. |
| 7,688,196 B2 | 3/2010 | Hannah |
| 7,715,983 B2 | 5/2010 | Barrus et al. |
| 7,759,649 B2 | 7/2010 | Frank |
| 7,848,732 B2 | 12/2010 | Thomas |
| 7,876,213 B2 | 1/2011 | Angelo et al. |
| 7,880,604 B2 | 2/2011 | Mckenna et al. |
| 7,889,066 B2 | 2/2011 | Mckenna et al. |
| 7,973,538 B2 | 7/2011 | Karam |
| 8,110,808 B2 | 2/2012 | Frank |
| 8,159,341 B2 | 4/2012 | Waugh |
| 8,400,317 B2 | 3/2013 | Johnson et al. |
| 8,427,290 B2 | 4/2013 | Davis et al. |
| 8,446,048 B2 | 5/2013 | Butt et al. |
| 8,610,560 B1 | 12/2013 | Conner |
| 8,994,540 B2 | 3/2015 | Fadell et al. |
| 9,019,096 B2 | 4/2015 | Cordaro et al. |
| 9,082,275 B2 | 7/2015 | Baker |
| 9,223,310 B2 | 12/2015 | Ballou |
| 9,244,474 B2 | 1/2016 | Smith et al. |
| 9,251,687 B2 | 2/2016 | Thompson et al. |
| 9,366,192 B2 | 6/2016 | Byrd et al. |
| 9,390,605 B2 | 7/2016 | Schmid |
| 9,466,194 B1 | 10/2016 | Kraz et al. |
| 9,513,898 B2 | 12/2016 | Solnit et al. |
| 9,576,460 B2 | 2/2017 | Dayal |
| 9,600,989 B2 | 3/2017 | Fadell et al. |
| 9,607,496 B2 | 3/2017 | Beggs et al. |
| 9,640,061 B1 | 5/2017 | Klimanis et al. |
| 9,721,456 B2 | 8/2017 | Thurlow et al. |
| 9,786,171 B2 | 10/2017 | Prokhorov |
| 9,814,278 B2 | 11/2017 | Chung et al. |
| 9,824,562 B2 | 11/2017 | Wilging |
| 9,851,699 B2 | 12/2017 | Fadell et al. |
| 9,915,930 B2 | 3/2018 | Matsuoka et al. |
| 9,922,541 B2 | 3/2018 | Moore et al. |
| 9,958,948 B2 | 5/2018 | Tannenbaum et al. |
| 9,979,476 B2 | 5/2018 | Breuer et al. |
| 10,055,965 B2 | 8/2018 | Prabhakar et al. |
| 10,074,255 B2 | 9/2018 | Prabhakar et al. |
| 10,096,228 B1 | 10/2018 | Eulloqui et al. |
| 10,152,884 B2 | 12/2018 | Frederick et al. |
| 10,154,401 B2 | 12/2018 | Olesen et al. |
| 10,154,460 B1 * | 12/2018 | Miller ................ A61B 5/4875 |
| 10,334,211 B2 | 6/2019 | Chard |
| 10,360,780 B2 | 7/2019 | Balaji et al. |
| 10,636,269 B2 | 4/2020 | Lacy |
| 10,739,187 B2 | 8/2020 | Schnaare et al. |
| 10,755,544 B2 | 8/2020 | Combe |
| 10,796,547 B1 | 10/2020 | Simpson et al. |
| 10,861,308 B1 | 12/2020 | Simpson et al. |
| 10,890,024 B2 | 1/2021 | Combe |
| 10,902,712 B2 | 1/2021 | D'angelo |
| 2003/0158635 A1 | 8/2003 | Pillar et al. |
| 2004/0021580 A1 | 2/2004 | Higgs |
| 2005/0156758 A1 | 7/2005 | Gilliss |
| 2005/0253709 A1 | 11/2005 | Baker |
| 2006/0226973 A1 | 10/2006 | Catlin |
| 2007/0069882 A1 | 3/2007 | Mahajan |
| 2007/0194893 A1 | 8/2007 | Deyoe |
| 2008/0055097 A1 | 3/2008 | Chidakel et al. |
| 2008/0084317 A1 | 4/2008 | Gakhar et al. |
| 2008/0177646 A1 | 7/2008 | Frink |
| 2009/0045925 A1 | 2/2009 | Demin et al. |
| 2011/0238234 A1 | 9/2011 | Chen |
| 2011/0320828 A1 * | 12/2011 | Boss ................ H02J 13/00004 |
| | | 713/300 |
| 2013/0278412 A1 | 10/2013 | Kelly et al. |
| 2015/0187194 A1 | 7/2015 | Hypolite et al. |
| 2015/0221221 A1 | 8/2015 | Schaefer et al. |
| 2016/0071388 A1 | 3/2016 | Levons |
| 2017/0032402 A1 | 2/2017 | Patsiokas et al. |
| 2017/0158117 A1 | 6/2017 | Nespolo et al. |
| 2018/0197402 A1 | 7/2018 | Zribi et al. |
| 2018/0284788 A1 | 10/2018 | Remboski et al. |
| 2018/0322405 A1 | 11/2018 | Fadell et al. |
| 2019/0066483 A1 | 2/2019 | Darling et al. |
| 2019/0236527 A1 * | 8/2019 | Bhaumik ............. G06Q 10/087 |
| 2020/0226914 A1 | 7/2020 | Lacy |
| 2020/0382913 A1 * | 12/2020 | Hasegawa ............ H04W 88/08 |
| 2021/0001689 A1 | 1/2021 | Kondrk et al. |
| 2021/0025730 A1 | 1/2021 | White |
| 2021/0074141 A1 | 3/2021 | Thompson et al. |

FOREIGN PATENT DOCUMENTS

| | | |
|---|---|---|
| CN | 104064026 A | 9/2014 |
| CN | 104134321 A | 11/2014 |
| CN | 104181885 A | 12/2014 |
| CN | 206726270 U | 12/2017 |
| CN | 107833428 A | 3/2018 |
| CN | 108814027 A | 11/2018 |
| CN | 108986414 A | 12/2018 |
| CN | 109544884 A | 3/2019 |
| DE | 102013109509 A1 | 11/2014 |
| DE | 202015004127 U1 | 7/2015 |
| DE | 102014105937 A1 | 10/2015 |
| DE | 102016211284 A1 | 12/2017 |
| DE | 102016010562 A1 | 3/2018 |
| DE | 102017120925 B3 | 11/2018 |
| DE | 202017004127 U1 | 11/2018 |
| DE | 102018201517 A1 | 8/2019 |
| DE | 202020106081 U1 | 11/2020 |
| EP | 0942274 A2 | 9/1999 |
| EP | 1463564 A2 | 10/2004 |
| EP | 1719083 A1 | 11/2006 |
| EP | 1851737 A2 | 11/2007 |
| EP | 2388581 A1 | 11/2011 |
| EP | 2333737 B1 | 3/2012 |
| EP | 2401728 B1 | 1/2013 |
| EP | 3022726 A1 | 5/2016 |
| EP | 3336407 A1 | 6/2018 |
| EP | 3012506 B1 | 4/2019 |
| EP | 3402126 B1 | 8/2019 |
| JP | 2002123896 A | 4/2002 |
| JP | 2002539441 A | 11/2002 |
| JP | 2006047050 A * | 2/2006 |
| JP | 2010286319 A * | 12/2010 |
| JP | 2011515752 A | 5/2011 |
| JP | 4754797 B2 | 6/2011 |
| JP | 5260186 B2 | 5/2013 |
| JP | 5305665 B2 | 7/2013 |
| JP | 5679497 B1 | 1/2015 |
| JP | 5685388 B2 | 1/2015 |
| JP | 2015536712 A | 12/2015 |
| JP | 6275838 B2 | 1/2018 |
| JP | 6544896 B2 | 6/2019 |
| JP | 2020178528 A | 10/2020 |
| JP | 6804145 B2 | 12/2020 |
| KR | 200401426 Y1 | 11/2005 |
| KR | 100572152 B1 | 4/2006 |
| KR | 100628837 B1 | 9/2006 |
| KR | 20060099991 A | 9/2006 |
| KR | 100695535 B1 | 3/2007 |
| KR | 100928028 B1 | 11/2009 |
| KR | 100956789 B1 | 5/2010 |
| KR | 200449792 Y1 | 8/2010 |
| KR | 100981654 B1 | 9/2010 |
| KR | 20110053826 A | 5/2011 |
| KR | 20110053827 A | 5/2011 |
| KR | 200453992 Y1 | 6/2011 |
| KR | 101102921 B1 | 1/2012 |

(56) References Cited

FOREIGN PATENT DOCUMENTS

| | | |
|---|---|---|
| KR | 101131329 B1 | 4/2012 |
| KR | 101150238 B1 | 6/2012 |
| KR | 101175202 B1 | 8/2012 |
| KR | 101219176 B1 | 1/2013 |
| KR | 101250774 B1 | 4/2013 |
| KR | 20140048165 A | 4/2014 |
| KR | 101389021 B1 | 5/2014 |
| KR | 101440477 B1 | 9/2014 |
| KR | 101459104 B1 | 11/2014 |
| KR | 101467821 B1 | 12/2014 |
| KR | 101497958 B1 | 3/2015 |
| KR | 20150086114 A | 7/2015 |
| KR | 101561096 B1 | 11/2015 |
| KR | 20150133536 A | 11/2015 |
| KR | 20160008475 A | 1/2016 |
| KR | 101612507 B1 | 4/2016 |
| KR | 101717620 B1 | 3/2017 |
| KR | 101907964 B1 | 10/2018 |
| KR | 20200091275 A | 7/2020 |
| KR | 102201959 B1 | 1/2021 |
| KR | 20210020268 A | 2/2021 |
| KR | 20210058081 A | 5/2021 |
| WO | 9828944 A1 | 7/1998 |
| WO | 03019494 A1 | 3/2003 |
| WO | 2004001695 A1 | 12/2003 |
| WO | 2006016872 A1 | 2/2006 |
| WO | 2006018739 A2 | 2/2006 |
| WO | 2008157402 A2 | 12/2008 |
| WO | 2009015201 A1 | 1/2009 |
| WO | 2010105825 A1 | 9/2010 |
| WO | 2011059128 A1 | 5/2011 |
| WO | 2013163657 A1 | 10/2013 |
| WO | 2014114772 A1 | 7/2014 |
| WO | 2014157973 A1 | 10/2014 |
| WO | 2014177496 A1 | 11/2014 |
| WO | 2015057187 A1 | 4/2015 |
| WO | 2016139219 A1 | 9/2016 |
| WO | 2016146759 A1 | 9/2016 |
| WO | 2017052736 A1 | 3/2017 |
| WO | 2018002905 A1 | 1/2018 |
| WO | 2018112495 A2 | 6/2018 |
| WO | 2018148713 A1 | 8/2018 |
| WO | 2018208355 A2 | 11/2018 |
| WO | 2019030786 A1 | 2/2019 |
| WO | 2020149432 A1 | 7/2020 |
| WO | 2020242810 A1 | 12/2020 |

* cited by examiner

ENHANCED HAZARD DETECTION DEVICE CONFIGURED WITH SECURITY AND COMMUNICATIONS CAPABILITIES

BACKGROUND

The Internet of things ("IoT") refers to the network of physical objects that are embedded with sensors, software, or other technologies for the purpose of connecting and exchanging data with other devices and systems over the Internet. Technologies have evolved due to the convergence of multiple technologies, real-time analytics, machine learning, ubiquitous computing, commodity sensors, and embedded systems. Traditional fields of embedded systems, wireless sensor networks, control systems, automation (including home and building automation), and others all contribute to enabling IoT. In the consumer market, IoT technology is synonymous with products pertaining to the concept of the "smart home."

A building automation system typically connects controlled devices to a central hub or "gateway." Currently, a typical building automation system monitors and controls building attributes such as lighting, climate, entertainment systems, and appliances, and may also include building security such as access control and alarm systems. Building automation has large potential regarding safety and security. Security is a primary driver of the demand for smart and connected devices. Current building automation includes a variety of smart security systems and surveillance setups. Integration of other security devices with existing building automation systems could provide consumers with a more comprehensive system.

BRIEF DESCRIPTION OF THE DRAWINGS

Detailed descriptions of implementations of the present invention will be described and explained through the use of the accompanying drawings.

Figure 1:
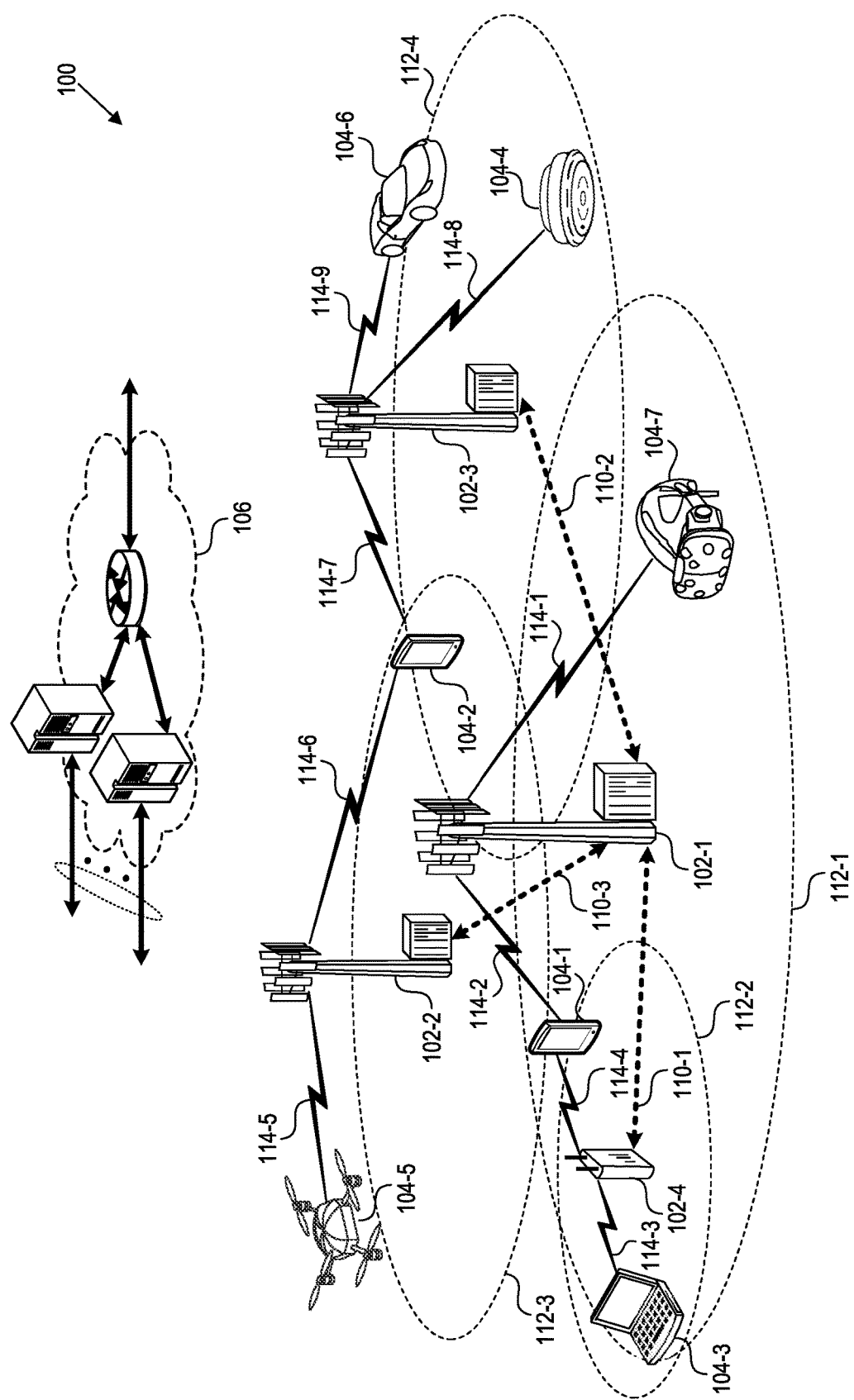
FIG. 1 is a block diagram that illustrates a wireless communications system including an enhanced hazard detection device.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed enhanced hazard detection devices integrate capabilities to offer protection against hazards, additional protections against intrusions, and enhanced communications capabilities. As used herein, a "hazard detection device" can refer to an electronic device equipped with one or more detection and communication capabilities. Examples of hazard detection devices include a smoke detector, a carbon monoxide detector, water detector, or any other device designed to detect and/or alert people in a dwelling or other structure of a hazard. This disclosure mainly refers to examples of smoke detectors; however, the description applies to other hazard detection devices. Further, while many hazard detection devices are for use indoors, other devices may be environmentally secure and thus can be deployed outdoors.

A conventional hazard detection device is a standalone device with a single dedicated functional purpose. For example, a conventional smoke detector is a standalone device that only serves to detect smoke in an environment and alert nearby persons of detected smoke. Hazard detection devices are typically found throughout a building, in every room. Most smoke detectors are battery powered, which comes with inherent limitations, the most significant being a lack of power capacity to support additional functions which require additional power.

The disclosed technology takes advantage of the ubiquity and necessity for hazard detection devices in multiple rooms of a building to create a communications network. The disclosed technology further incorporates power management and/or additional power sources to offer functionality that is not found in conventional standalone hazard detection devices. For example, an enhanced hazard detection device can draw power from a combination of additional sources such as a building's electrical system, Power over Ethernet (PoE), and a built-in backup battery in case of power outage. Consequently, the enhanced hazard detection device can integrate additional security functions to provide power to primary systems/sensor, dynamic protection against hazards, additional defenses against intrusions, and new communications capabilities while prioritizing operation of a core hazard detection function.

With additional power sources and dynamic power management capabilities, an enhanced hazard detection device can function as a connected smart hub offering a multitude of safety, security, and communications features. Examples of additional devices or components of the enhanced hazard detection device include water sensors that monitor for potential water damage from broken pipes or low-temperature sensors that monitor for a temperature to prevent pipes from freezing. In another example, an enhanced hazard detection device serves as a center of a smart security hub ("central hub") which receives information from one or more security cameras, door and window sensors, and motion sensors that monitor unwanted entries. The security cameras and other sensors can be integrated into one or more enhanced hazard detection devices located throughout a building and/or are remotely located from and communicatively couple to a wireless network for the enhanced hazard detection devices.

The enhanced hazard detection devices can be configured to install easily on ceilings or walls, which are desired locations for wireless network devices as well as for hazard detection devices. In one example, an enhanced hazard detection device can simultaneously act as a WiFi or Bluetooth access point, or as part of a mesh network including other enhanced hazard detection devices. The enhanced hazard detection device, acting as a center of a smart hub, can facilitate wired or wireless communications between other hubs and devices with communication capabilities. An enhanced hazard detection device can include multiple sensors, transducers, and transceivers to monitor environmental conditions. Further, the AC power of a building can be used to power multiple hazard detection devices and to communicate between other devices via a powerline modem.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless communications system including an enhanced hazard detection device. As shown, a wireless telecommunication network 100 ("network 100") includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown).

The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), an IoT device such as hazard detection device in a home (e.g., smoke detector 104-4). A wireless device can be included in another device such as, for example, a drone (e.g., wireless device 104-5), a mirror device in a vehicle (e.g., wireless device 104-6), an augmented reality/virtual reality (AR/VR) device such as a head-mounted display device (e.g., wireless device 104-7), a wearable device such as a smartwatch, a portable gaming console, or a wirelessly connected sensor that provides data to a remote server over a network.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Enhanced Hazard Detection Device

Figure 2:
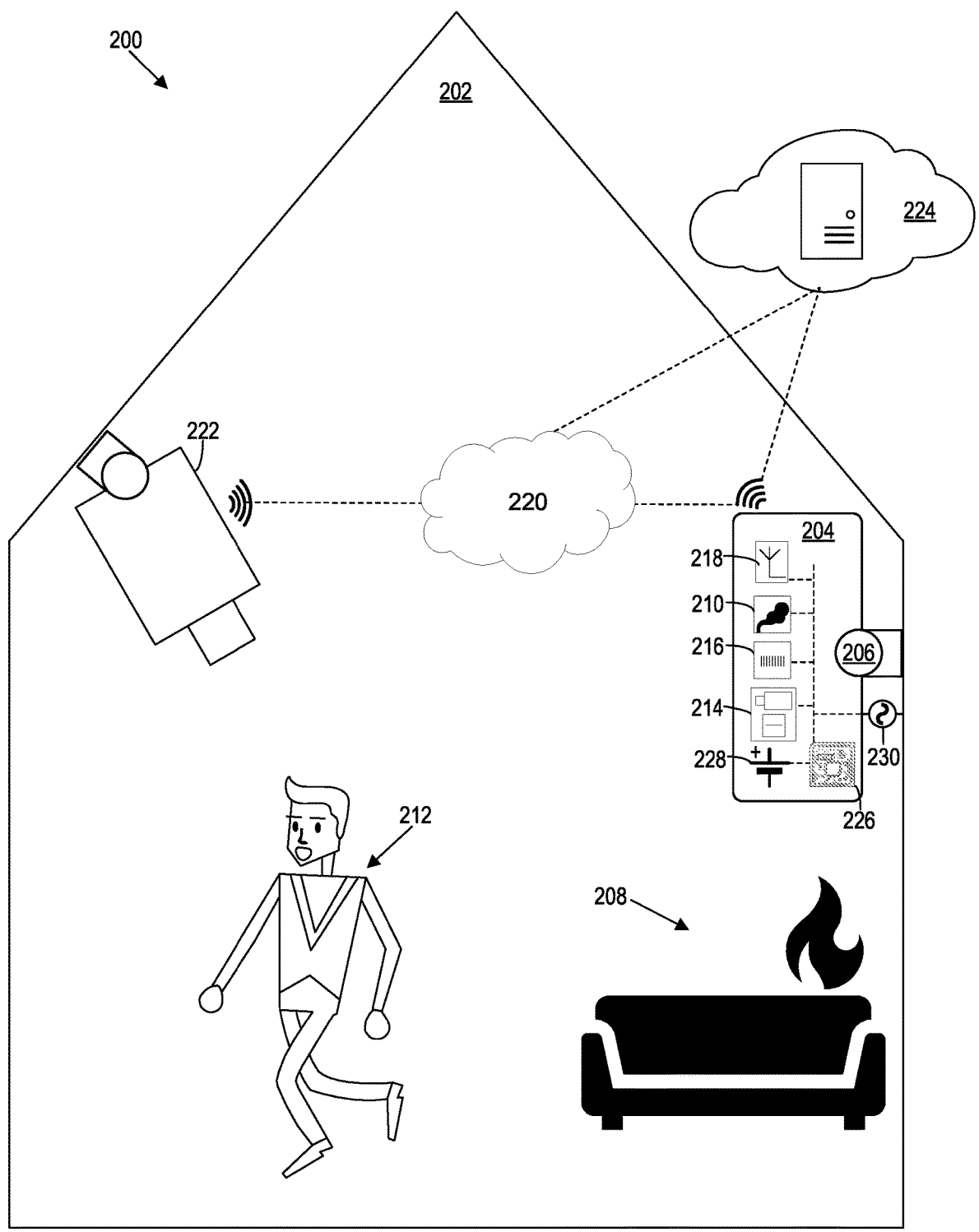
FIG. 2 is a diagram that illustrates a system including an enhanced hazard detection device deployed in a building.

FIG. 2 is a diagram that illustrates a system 200 deployed in a building 202 and including an enhanced hazard detection device 204. The system 200 includes electronic devices and components disposed inside the building 202, as well as components outside of the building 202. As shown, the enhanced hazard detection device 204 is a smoke detector mounted on a wall of a room in the building 202. The enhanced hazard detection device 204 is mounted on a mounting assembly 206 that is configured to position the enhanced hazard detection device 204 in a desired orientation. The housing of the enhanced hazard detection device 204 is movable relative to the mounting assembly 206.

The enhanced hazard detection device 204 can include electronic components, sensors, transducers, and transceivers. In the illustrated example, the enhanced hazard detection device 204 includes a primary sensor 210 and one or more secondary sensors 214. The primary sensor is configured to continuously monitor a physical property indicative of a hazard in a vicinity of the enhanced hazard detection device 204. Examples of the physical property include toxic gas such as carbon monoxide or propane, or temperature or smoke indicative of a fire 208. In another example, a primary sensor is a water detection sensor configured to monitor for potential water damage from a broken pipe or a low-temperature sensor configured to monitor a temperature in the vicinity to prevent a pipe from freezing and bursting. In the illustrated example, the enhanced hazard detection device 204 is a smoke detector and the primary sensor 210 is a smoke sensor.

The secondary sensors 214 are configured to detect, record, or measure another physical property in the vicinity of the hazard detection device 204 and respond accordingly. The secondary sensors 214 can include security sensors such as an intrusion detection sensor configured to detect intrusion into the building 202 by an object 212. Examples of an intrusion detection sensor include an image sensor (e.g., camera) that can capture an image of the object 212, a motion sensor that can detect motion of the object 212, or a glass break sensor that can detect that a pane of glass is shattered/broken. The enhanced hazard detection device 204 can include an audible signal generator (not shown) configured to generate an audible alert in response to detecting the primary physical property in the vicinity of the hazard detection device. The audible signal generator can be prioritized with the primary sensor 210.

The primary sensor 210 is configured to operate in an uninterrupted manner to provide reliable and consistent hazard detection. In contrast, the secondary sensors 214 can operate discontinuously (e.g., as needed) to provide secondary functions for the enhanced hazard detection device 204. As such, the enhanced hazard detection device 204 has a core hazard detection function and optional ancillary functions that operate discontinuously so as to avoid consuming a power resource that is required for the primary sensor 210 to remain operational in an uninterrupted manner.

The enhanced hazard detection device 204 includes communications circuitry 218 configured to couple the enhanced hazard detection device 204 to one or more wired or wireless communications networks 220. Examples include a local area network (LAN) wide area network (WAN) such as the Internet, a telecommunications network (e.g., 5G), and the like. The communications circuitry 218 can include a transceiver and an antenna configured to communicate data between the enhanced hazard detection device 204 and other electronic systems such as a remotely located imaging device 222 or a cloud-based system 224. The communications circuitry 218 can connect the enhanced hazard detection device 204 to other types of networks such as Bluetooth, WiFi, etc.

The enhanced hazard detection device 204 can process data received over the wireless networks 220. For example, the enhanced hazard detection device 204 can capture sensor data indicative of an intrusion into the building 202 and communicate the intrusion data over the wireless networks 220 to a remote server of the cloud-based system 224. The remote server can input the sensor data to a model in accordance with artificial intelligence or machine learning to generate predictive feedback of a potential intrusion.

The enhanced hazard detection device 204 includes a power management controller 216 configured to manage usable power for the primary sensor 210, the secondary sensors 214, and the communications circuitry 218. Specifically, the power management controller 216 can allocate usable power for the secondary sensors 214 and the communications circuitry 218 conditioned on sufficient power being available for the primary sensor 210 to ensure uninterrupted hazard detection. In one example, the usable power can be dynamically re-allocated based on an amount of usable power available for the primary sensor 210. As such, the power management controller 216 can permanently prioritize usable power for the primary sensor 210 over the secondary sensors 214 and/or the communications circuitry 218.

The enhanced hazard detection device 204 can dynamically allocate usable power to one or more sensors integrated therein. In one example, the change in the usable power is based on a state of a power source (e.g., on/off) or an available amount of the usable power (e.g., low/high charge of battery). In response to detecting the change in the usable power, the power management controller 216 can cause the enhanced hazard detection device 204 to deallocate power from one or more of the multiple sensors except the hazard sensor, to maintain operation that outlasts any secondary sensor.

The enhanced hazard detection device 204 houses electronic circuitry 226 including a processor and memory that can store software instructions that, when executed by the processor, causes the enhanced hazard detection device 204 to perform or not perform one or more actions. For example, the electronic circuitry 226 can monitor usable power available to the enhanced hazard detection device 204.

In one example, the usable power is provided to the hazard detection device from one or more internal or external power sources. An example of an internal power source is a back-up battery 228 and an example of an external power source is an AC power supply 230 of the building 202. In one example, the change in the usable power is based on an unavailability of the external power source (e.g., AC power shuts off). The enhanced hazard detection device 204 can detect a change in an amount of the usable power available for the enhanced hazard detection device 204 and, in response, redirect usable power from the secondary sensors 214 or the communications circuitry 218 to the primary sensor 210 to provide uninterrupted hazard detection.

In one example, the primary sensor 210 can detect the primary physical property in the vicinity of the hazard detection device 204 and, in response, allocate usable power to activate a secondary sensor configured to capture audio or images of the vicinity of the hazard detection device. The enhanced hazard detection device can allocate usable power to activate the communications circuitry 218 and communicate an indication of the detected hazard over the wireless communication networks 220 to a remote device or store an indication of the hazard on the cloud-based system 224.

Figure 3:
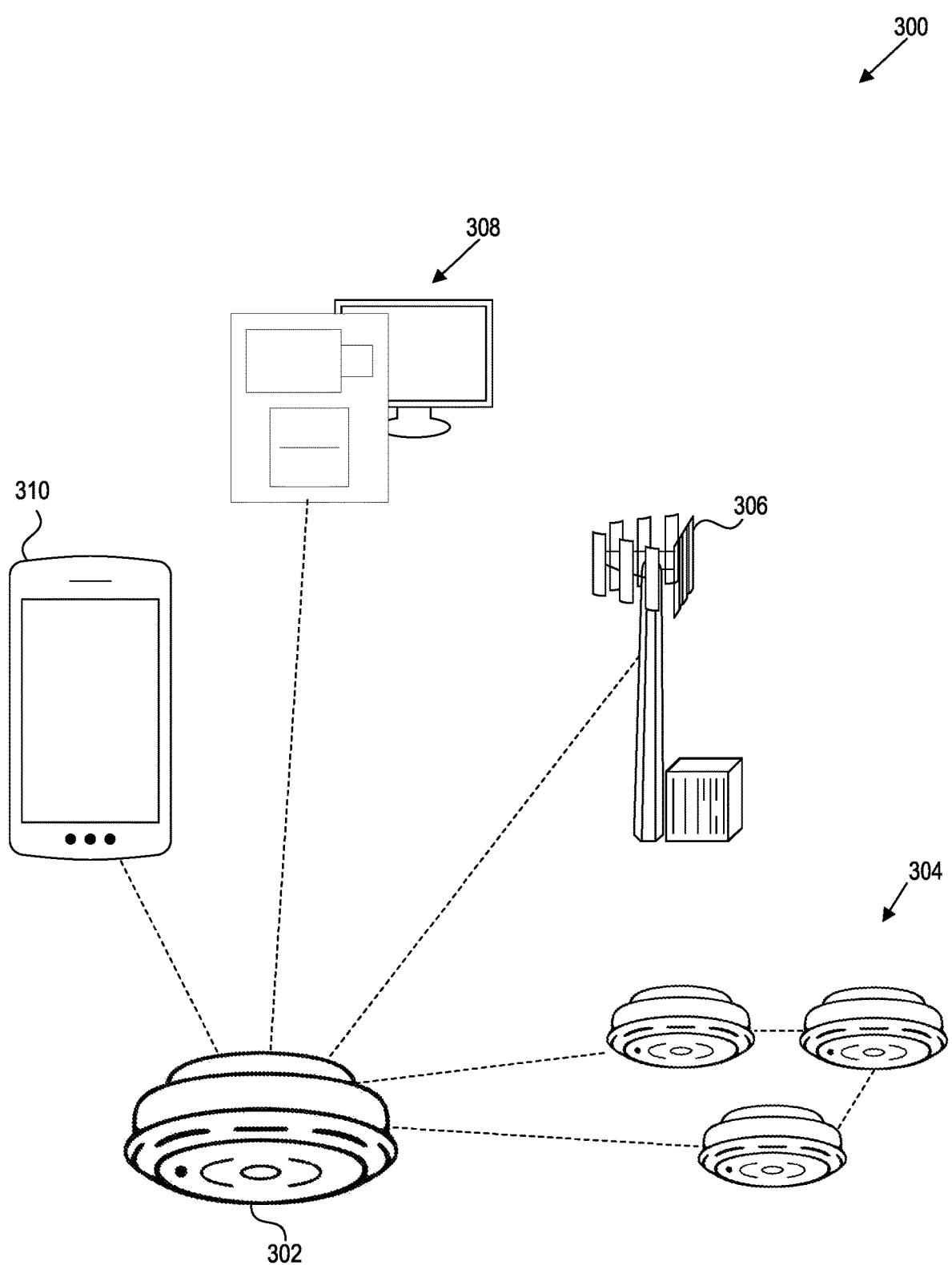
FIG. 3 is a diagram that illustrates a wireless network including an enhanced hazard detection device configured as a wireless network device.

FIG. 3 is a diagram that illustrates a wireless network 300 including an enhanced hazard detection device 302 configured as a wireless network device. The communications circuitry of the enhanced hazard detection device 302 can communicatively couple the enhanced hazard detection device 302 to one or more other enhanced hazard detection device devices 304, thereby establishing at least a portion of a local area network (LAN). As such, the enhanced hazard detection devices 302 and 304 can operate as access points for an endpoint device to access the LAN. Examples of endpoint devices Internet-of-Things (IOT) devices 308 (e.g., tablet computers, wearable devices, smart home devices) and smartphones 310.

In one example, the communications circuitry of the enhanced hazard detection device 302 includes a long-range wireless radio (e.g., Wi-Fi) and a short-range wireless radio (e.g., Bluetooth). The enhanced hazard detection device 302 can use the long-range wireless radio to communicatively couple the enhanced hazard detection device 302 to a LAN and use the short-range wireless radio to enable access by an endpoint device to the LAN. In one example, the long-range wireless radio is a cellular radio configured to enable the enhanced hazard detection device 302 to connect to a base station 306 of a telecommunications network.

In one example, the enhanced hazard detection device 302 is configured as a security hub that receives data from one or more security cameras, door or window sensors, and motion sensors that monitor intrusion into a building that houses the security hub. In one example, the power management controller of the enhanced hazard detection device 302 can monitor usable power available to each of the multiple hazard detection devices and dynamically select one of the multiple hazard detection devices as a central hub for the LAN based on the usable power available to the multiple hazard detection devices.

Figure 4:
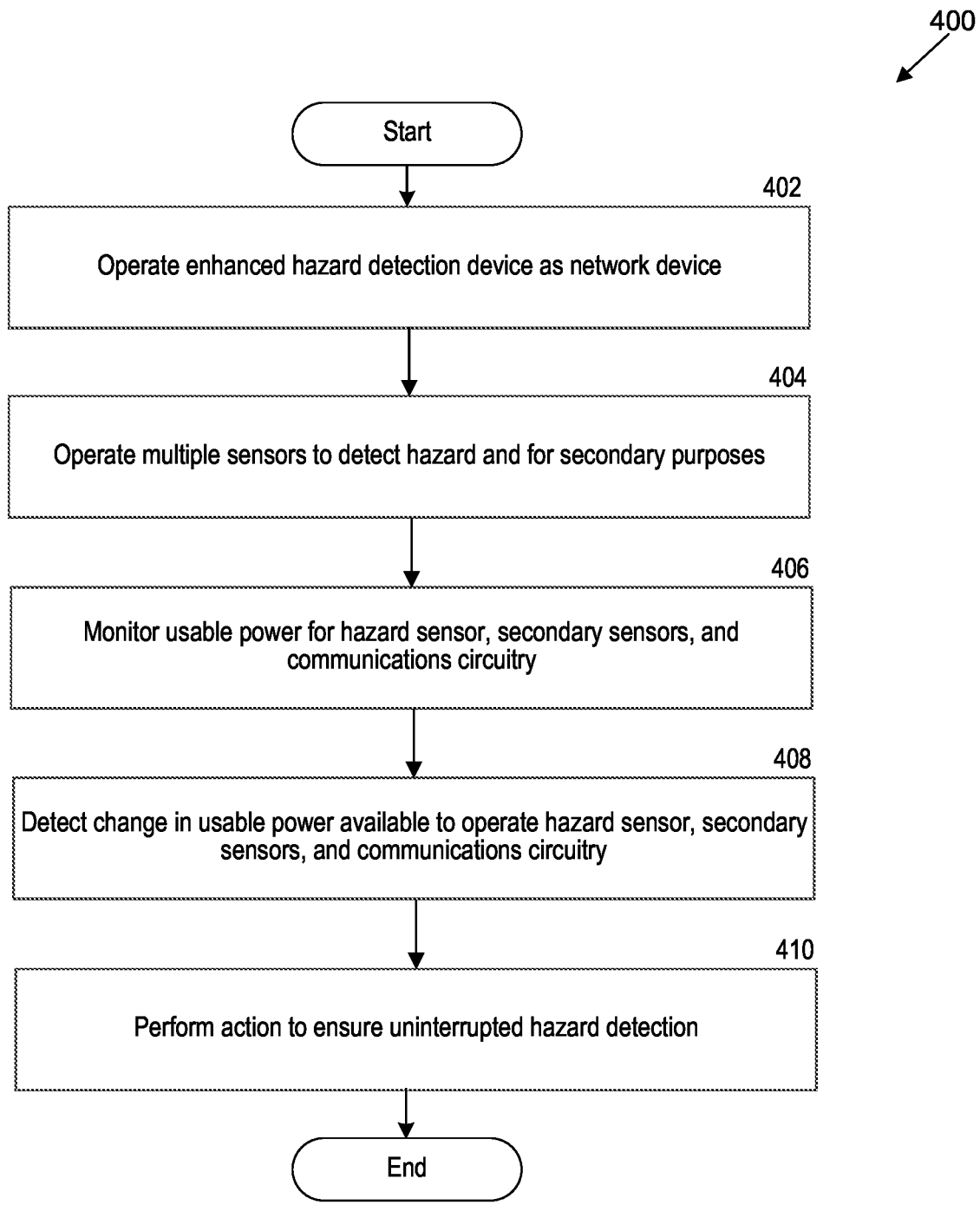
FIG. 4 is a flow diagram that illustrates processes performed by an enhanced hazard detection device to provide uninterrupted hazard detection.

FIG. 4 is a flow diagram that illustrates processes 400 performed by an enhanced hazard detection device to provide uninterrupted hazard detection. In one example, a power management controller monitors usable power to dynamically enable security and communications functions while maintaining uninterrupted hazard detection. In another example, the communications circuitry enables the enhanced hazard detection device to form a dynamic wireless network and/or operate as a network access point for endpoint devices.

At 402, the enhanced hazard detection device operates as a network device of a wireless network. For example, the communications circuitry can cause the enhanced hazard detection device to operate as an access point for a local network. As such, an endpoint device (e.g., IOT device, smartphone, tablet computer, wearable device, smart home device) can access the local network via the enhanced hazard detection device. In one example, the enhanced hazard detection device can wirelessly couple to multiple enhanced hazard detection devices to form a local network, where each enhanced hazard detection device has multiple sensors including a hazard detection sensor and a secondary sensor (e.g., intrusion detection sensor). I At 404, the hazard sensor of the enhanced hazard detection device detects a physical property (e.g., smoke, gas, temperature) indicative of the hazard. The enhanced hazard detection device can measure an amount of the physical property and report the detection of the physical property and/or the measure over a wireless network to a remote device such as a public safety center or a homeowner's mobile device.

At 406, the enhanced hazard detection device monitors usable power available for the sensors and communications circuitry of the enhanced hazard detection device. The usable power is provided by one or more power sources such as an internal power source (e.g., DC battery) and an external power source (e.g., PoE, AC power). In one example, the enhanced hazard detection device monitors the state of a power source such as whether the power source is on/off or connected/disconnected. In another example, the enhanced hazard detection device monitors an amount of usable power available from a power source such as whether the charge of a battery is below a threshold level.

At 408, the enhanced hazard detection device detects a change in the usable power available to operate the sensors and communications circuitry. In one example, where the enhanced hazard detection device operates as a central hub for a local network, the central hub can monitor and detect a change in usable power available for multiple enhanced hazard detection devices. The change in the usable power can indicate that a power source has been shut off or disconnected or that a battery exceeded a critical threshold nearing depletion. In one example, the central hub detects that another enhanced hazard detection device has greater available usable power to operate as a central hub for the local network whereas the usable power for the current central hub has fallen below a threshold amount.

At 410, the enhanced hazard detection device performs an action to ensure uninterrupted hazard detection. In one example, the enhanced hazard detection device redirects usable power away from secondary sensors and/or the communications circuitry and to the hazard sensor. For example, the enhanced hazard detection device can deallocate usable power of a security sensor and allocate that usable power for the hazard detection device. In one example, the enhanced hazard detection device shuts down the secondary sensors and communications circuitry to preserve power for the hazard sensor.

In another example, a central hub with a change in usable power can dynamically select another hazard detection device as a next central hub for the local network based on the usable power available to the next central hub. In another example, the enhanced hazard detection device reallocates usable power away from wireless communications of the multiple hazard detection devices (e.g., shuts down the network) and away from the multiple sensors (e.g., shuts down the security system) except any hazard detection sensors to ensure uninterrupted hazard detection.

Computer System

Figure 5:
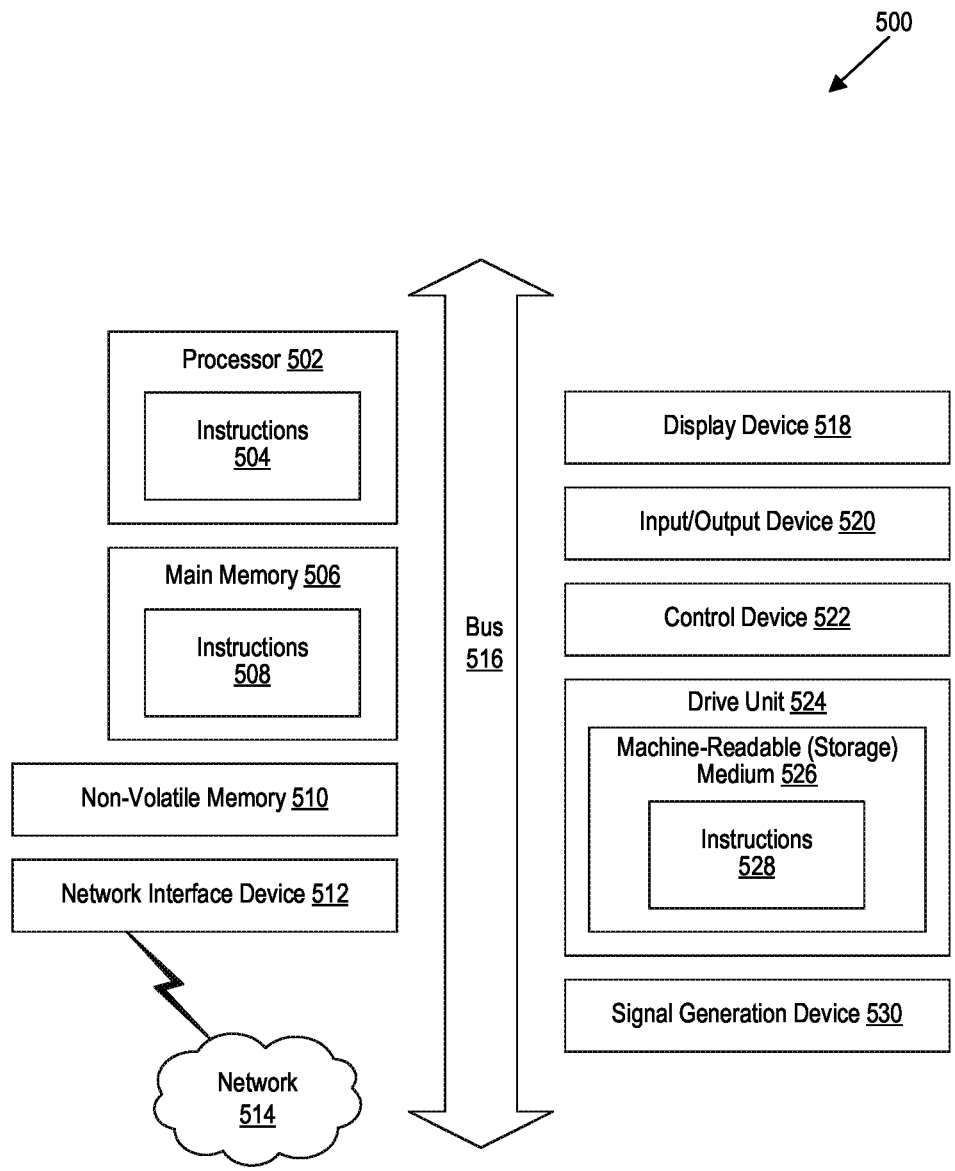
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 (e.g., enhanced hazard detection devices 104-4, 202, 302) can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A hazard detection device, comprising:
   a primary sensor configured to continuously monitor a first physical property indicative of a hazard in a vicinity of the hazard detection device;
   a secondary sensor configured to detect or measure a second physical property in the vicinity of the hazard detection device and respond to the second physical property,
      wherein the secondary sensor is configured to operate discontinuously;
   communications circuitry configured to couple the hazard detection device to a wireless communication network;
   a power management controller configured to dynamically manage usable power for the primary sensor, the secondary sensor, and the communications circuitry,
      wherein allocating usable power for the secondary sensor and the communications circuitry is conditioned on sufficient power being available for the primary sensor;
   at least one hardware processor; and
   at least one non-transitory memory storing instructions, which, when executed by the at least one hardware processor, cause the hazard detection device to:
      monitor the usable power available to the hazard detection device,
         wherein the usable power is provided for the hazard detection device from one or more power sources,
      detect a change in an amount of the usable power available for the hazard detection device; and
      in response to the detected change in the amount of the usable power, redirect usable power for the secondary sensor or the communications circuitry to the primary sensor to provide uninterrupted hazard detection.

2. The hazard detection device of claim 1 further comprising:
an audible signal generator configured to generate an audible alert in response to detecting the primary physical property,
wherein the primary physical property includes smoke, temperature, or gas in the vicinity of the hazard detection device, and
wherein the hazard detection device is configured to be installed indoors.

3. The hazard detection device of claim 1, wherein the secondary sensor is an intrusion detection sensor comprising:
an image sensor configured to capture an image of an object in the vicinity of the hazard detection device,
a motion sensor configured to detect motion of an object in the vicinity of the hazard detection device, or
a glass break sensor configured to detect that a pane of glass is shattered or broken.

4. The hazard detection device of claim 1, wherein the power management controller is configured to permanently prioritize usable power for the primary sensor over the secondary sensor and the communications circuitry.

5. The hazard detection device of claim 1 further caused to:
detect the primary physical property in the vicinity of the hazard detection device; and
in response to detecting the primary physical property:
allocate usable power to activate the secondary sensor, wherein the secondary sensor is configured to capture audio or images of the vicinity of the hazard detection device, or
allocate usable power to activate the communications circuitry,
wherein the communications circuitry is configured to communicate an indication of the hazard over the wireless communication network to a remote device or store an indication of the hazard on a cloud computing network.

6. The hazard detection device of claim 1, wherein the hazard detection device is a first hazard detection device, and the communications circuitry is caused to:
couple the first hazard detection device to a second hazard detection device thereby forming at least a portion of a local area network (LAN),
wherein the first hazard detection device and the second hazard detection devices are each access points for an endpoint device to access the LAN.

7. The hazard detection device of claim 1, wherein the communications circuitry includes a long-range wireless radio and a short-range wireless radio, the communications circuitry being caused to:
use the long-range wireless radio to couple the hazard detection device to a local area network (LAN) and use the short-range wireless radio to enable access by an endpoint device to access the wireless communications network through the LAN,
wherein the endpoint device includes an Internet-of-Things (IOT) device, smartphone, tablet computer, wearable device, or smart home device, and
wherein the long-range wireless radio is a Wi-Fi radio or the short-range radio is a Bluetooth radio.

8. The hazard detection device of claim 1, wherein:
the primary sensor is a hazard detection sensor configured to detect smoke or gas in a room of a building housing the hazard detection device; and
the secondary sensor is an intrusion detection sensor configured to detect intrusion into the room of the building housing the hazard detection device.

9. The hazard detection device of claim 1, wherein the communications circuitry is caused to:
configure the hazard detection device to function as a network access point for an endpoint device,
wherein the endpoint device includes an Internet-of-Things (IOT) device, smartphone, tablet computer, wearable device, or smart home device.

10. The hazard detection device of claim 1, wherein the power management controller is caused to:
dynamically re-allocate usable power among multiple secondary sensors and the communications circuitry while consistently providing usable power to the primary sensor,
wherein the usable power is dynamically re-allocated based on an amount of usable power available for the primary sensor or based on a state of a source of usable power available for the hazard detection device.

11. The hazard detection device of claim 1, wherein the primary sensor is a water detection sensor configured to monitor for potential water damage from a broken pipe or a low-temperature sensor configured to monitor a temperature in the vicinity of the hazard detection device to prevent a pipe from freezing.

12. The hazard detection device of claim 1 being configured as a security hub that receives data from one or more security cameras, door or window sensors, and motion sensors that monitor intrusion into a building that houses the security hub.

13. The hazard detection device of claim 1 further caused to:
detect the primary physical property indicative of the hazard;
measure an amount of the primary physical property; and
report the detection of the primary physical property and the measure of the primary physical property over the wireless communications network to a remote device.

14. At least one computer-readable storage medium, excluding transitory signals and carrying instructions, which, when executed by at least one data processor of a hazard detection device, cause the hazard detection device to:
dynamically activate multiple sensors integrated in the hazard detection device,
wherein the multiple sensors include a hazard sensor configured to detect a hazard in a vicinity of the hazard detection device and a security sensor configured to detect intrusion into the vicinity, and
wherein the hazard sensor is prioritized to provide continuous hazard detection among the multiple sensors; and
communicatively couple the hazard detection device to multiple hazard detection devices in a local area network (LAN) configured to access a wide area network (WAN),
wherein, when coupled to the LAN, the hazard detection device functions as an access point that enables access by an endpoint device to the WAN through the hazard detection device.

15. The computer-readable storage medium of claim 14, wherein the hazard detection device is further caused to:
detect a change in the usable power available to the multiple sensors of the hazard detection device, wherein the usable power is provided from one or more power sources, and wherein the change in the usable power is based on a state of a power source or an available amount of the usable power, and in response to detecting the change in the usable power, deallocate usable power from one or more of the multiple sensors except the hazard sensor to maintain operation that outlasts any other of the multiple sensors.

16. The computer-readable storage medium of claim 14, wherein the hazard detection device is further caused to:

monitor usable power available to each of the multiple hazard detection devices; and dynamically selecting one of the multiple hazard detection devices as a central hub for the LAN based on the usable power available to the multiple hazard detection devices.

17. The computer-readable storage medium of claim 14, wherein the multiple sensors are powered by one or more power sources including an internal power source and an external power source, and wherein the hazard detection device is communicatively coupled to the multiple hazard detection devices over a wired power line.

18. A method performed by a hazard detection system, the method comprising:

wirelessly coupling multiple hazard detection devices to form a local area network (LAN), wherein each hazard detection device has multiple sensors including a hazard detection sensor and an intrusion detection sensor;

detecting a change in usable power available to the multiple hazard detection devices, wherein the usable power for each hazard detection device is provided from one or more power sources to operate the multiple sensors, wherein the change in the usable power is based on a state of a power source or an amount of usable power available from a power source;

dynamically selecting one of the multiple hazard detection devices as a central hub for the LAN based on the usable power available to the multiple hazard detection devices.

19. The method of claim 18, wherein detecting the change in the usable power comprises:

detecting that usable power for a central hub is below a threshold amount; and reallocating usable power away from wireless communications of the multiple hazard detection devices and away from the multiple sensors except any of the hazard detection sensors to ensure uninterrupted hazard detection.

20. The method of claim 18, wherein each of the hazard detection devices is a smoke detector and the intrusion detection sensor corresponds to an image sensor or a motion sensor.

* * * * *